United States Patent [19]
Ito et al.

[11] Patent Number: 5,608,376
[45] Date of Patent: Mar. 4, 1997

[54] PAD WEAR AND PAD WEAR INDICATOR PROBE

[75] Inventors: Katsuya Ito; Hitoshi Takanashi, both of Yokkaichi, Japan

[73] Assignee: Sumitomo Wiring Systems, Ltd., Mie, Japan

[21] Appl. No.: 265,112

[22] Filed: Jun. 24, 1994

[30] Foreign Application Priority Data

Aug. 6, 1993 [JP] Japan .................................. 5-215037

[51] Int. Cl.⁶ ...................................................... B60Q 1/00
[52] U.S. Cl. ........................... 340/454; 340/453; 116/208; 200/61.4; 73/121; 73/129
[58] Field of Search .................................. 340/453, 454; 116/208; 200/61.4; 73/121; 1/129

[56] References Cited

U.S. PATENT DOCUMENTS

| | | | |
|---|---|---|---|
| 3,886,517 | 5/1975 | Ohtake et al. | 340/459 |
| 3,958,445 | 5/1976 | Howard et al. | 340/454 |
| 4,204,190 | 5/1980 | Wiley et al. | 340/453 |
| 4,646,001 | 2/1987 | Baldwin et al. | 340/454 |
| 5,307,673 | 5/1994 | Ito et al. | 73/129 |

FOREIGN PATENT DOCUMENTS

| | | |
|---|---|---|
| 0464347 | 8/1992 | European Pat. Off. . |
| 2311197 | 12/1974 | Germany . |
| 1414090 | 11/1975 | Germany . |
| 3007887 | 9/1981 | Germany . |
| 62-97332 | 6/1987 | Japan . |
| 1395837 | 5/1975 | United Kingdom . |

*Primary Examiner*—Jeffery Hofsass
*Assistant Examiner*—Daryl C. Pope
*Attorney, Agent, or Firm*—Oliff & Berridge

[57] ABSTRACT

A brake pad wear probe contains a plurality of terminals turned or bent into a U-shape with their tip positions offset from each other. The terminals are cut in stages according to the wear development degree of the brake pad. The terminals define energization routes to electro-magnetic coils at relays, and the broken line state of the terminal can be detected at the respective relay by detection of a break in its corresponding energization route. As a result, electro-magnetic switches work in response to the wear development degree, turning on predetermined indicator lamps of a display to inform a driver of the brake wear condition.

3 Claims, 5 Drawing Sheets

5,608,376

PAD WEAR AND PAD WEAR INDICATOR PROBE

BACKGROUND OF THE INVENTION

This invention relates to a pad wear indicator for informing the user of brake pad wear and more particularly to a pad wear indicator for informing the user of brake pad wear in response to the broken line state of an electric wire path disposed in a pad wear indicator probe wearing together with a brake pad.

A pad wear indicator comprises a pad wear indicator probe containing a U-shaped electric wire path that is broken when the probe wears together with its corresponding brake pad and includes a pad wear indicator display for detecting the broken line state of the electric wire path for displaying the wear state of the brake pad. FIGS. 10 and 11 show, respectively, a conventional pad wear indicator probe and a corresponding conventional pad wear indicator display.

To form the pad wear indicator probe 1, a copper wire 3 having barrel parts 2 that can be crimped onto electric wires formed at both ends is formed into a U-like shape, and the barrel parts 2 are crimped onto a pair of electric wires 4 whose tips are coated. The entire assembly is molded in resin. The U-shaped turn part is directed toward the brake disk side for use as a brake pad.

The pad wear indicator display 5 (FIG. 11) comprises a relay 7 having an electro-magnetic coil 6 in series with the pad wear probe 1 that is connected to a power line. An indicator lamp 9 in series with an electro-magnetic switch 8 of the relay 7 is also connected to the power line. The electro-magnetic switch 8 is turned off when the electro-magnetic coil 6 is energized.

With this construction, the copper wire 3, located within the pad wear probe 1, initially supplies power to the electro-magnetic coil of the relay 7 via the electric wire 4 and the copper wire 3 (FIG. 11). Therefore, the electro-magnetic switch 8 is turned off as shown with the broken line, and the indicator lamp 9 cannot be energized.

As a brake is used, the lining of its brake pad wears along with the pad wear probe 1. When the probe wears a predetermined amount from the tip, the turn part or bend of the copper wire 3 in the pad wear probe I wears until it is eventually cut, thus opening the circuit. Then, the energization path to the electro-magnetic coil 6 is broken, and thus, the electro-magnetic coil 6 becomes deenergized, turning on the electro-magnetic switch 8, as shown with a solid line in FIG. 11. Accordingly, the indicator lamp 9 is energized, prompting the user to replace the brake pad.

When the conventional pad wear indicator described above has worn by a preset amount, it suddenly prompts the user to replace the brake pad without much warning. Since the remaining amount in which the user is to be prompted to replace the brake pad is made the minimum value, he or she, upon being suddenly prompted to replace the brake, may lack sufficient time to do so. If the lamp goes on during running, he or she may panic or lose his or her peace of mind. While the setup remaining amount of the lining could be increased to avoid panic by allowing the car operator adequate time in which to replace the brake pad, premature indication of a worn brake pad is wasteful.

SUMMARY OF THE INVENTION

It is therefore an object of the invention to provide a pad wear indicator that can inform the user of accurate replacement time of a brake pad without his or her feeling a sense of unease or panic.

Another object of the invention is to provide a brake wear indicator that maximizes the life and usefulness of each brake pad.

According to a first aspect of the present invention, there is provided a pad wear indicator comprising a probe wearing together with a brake pad having U-shaped electric wire paths that are directed toward and disposed near the brake pad side, and a display section for detecting a broken line state of each of the electric wire paths for displaying a wear state of the brake pad. The probe comprises a plurality of electric wire paths having different overall lengths between the turn part and the brake pad. The display section indicates the broken line state for each of the electric wire paths to display and provide an indication of a wear amount as the brake pad and probe progressively deteriorate.

According to another aspect of the invention, there is provided a pad wear indicator probe containing a plurality of U-shaped electric wire paths having turn parts that are directed toward a tip side of the probe, connected to a brake pad, and worn together with the brake pad. The electric wire paths differ in length between the turn part and the brake pad. In a preferred embodiment, the electric wire paths are on a slope line path that is substantially diagonally oriented to a wear direction. A plurality of detection line paths are drawn out from parts having different respective lengths to the brake pad on the slope line path.

According to yet another aspect of the invention, there is provided a pad wear indicator display for detecting a broken line state of each of the U-shaped electric wire paths having turn parts that are directed toward the brake pad side in a probe that wears together with a brake pad for displaying the wear state of the break pad by displaying the broken line state of each of the electric wire paths.

The pad wear indicator of the present invention includes internal electric wire paths that differ in distance or length between the turn part and the brake pad. Therefore, as the brake pad wears, the probe also wears, and the turn parts are exposed and cut at different intervals or stages. That is, the electric wire path closest to the brake pad is cut when the wear amount of the brake pad is small; the electric wire path furthest from the brake pad is subject to wear only when the wear amount of the brake pad achieves a more advanced stage of deterioration. The display section detects the broken line state of each of the electric wire paths. Since the electric wire paths are broken depending on the wear amount, the display section displays the wear amount in stages by displaying the broken line state.

The pad wear indicator probe of the invention includes a slope line path oriented substantially diagonal to the wear direction and is shaven from the tip side gradually as the probe wears. A plurality of detection line paths drawn out from the parts different in distance to the brake pad are connected to the slope line path, so that the detection line path drawn out from the part nearest to the brake pad first becomes deteriorated and eventually, nonconducting.

As described above, the pad wear indicator display of the invention displays the wear amount of a brake pad in stages, so that the user can know the wear condition before the brake pad needs to be replaced due to wear and can reduce the chances of panic or feeling a sense of unease at sudden notice. Since the user is informed of the wear condition as it progresses, the maximum wear amount can also be set for finally prompting the user to replace the brake pad for using resources effectively, thus extending the service life of the brake pad.

BRIEF DESCRIPTION OF THE DRAWINGS

The invention will be described in detail with reference to the following drawings, wherein.

DETAILED DESCRIPTION OF PREFERRED EMBODIMENTS

Figure 1:
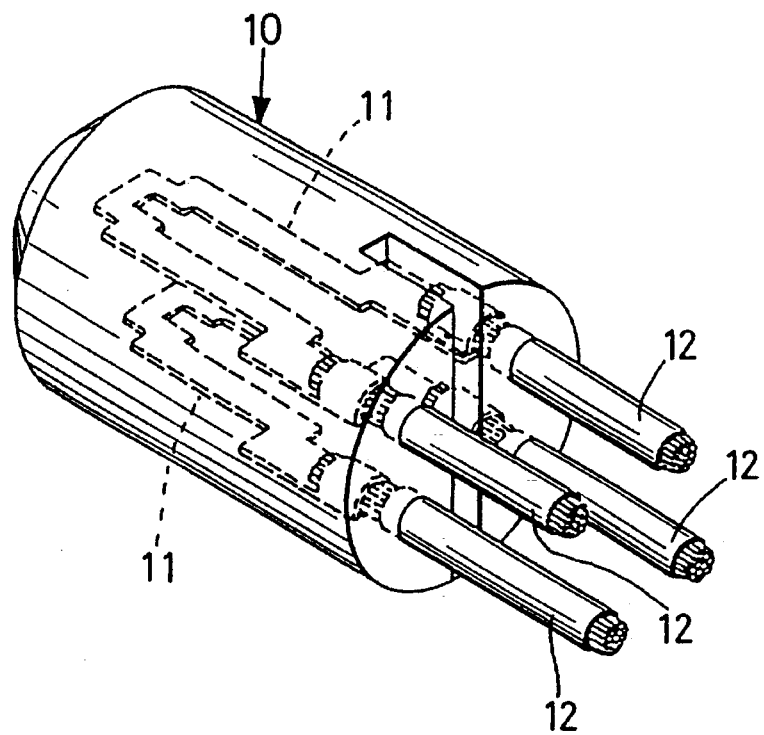
FIG. 1 is a perspective view showing the structure of a pad wear indicator probe according to one embodiment of the invention.
Figure 2:
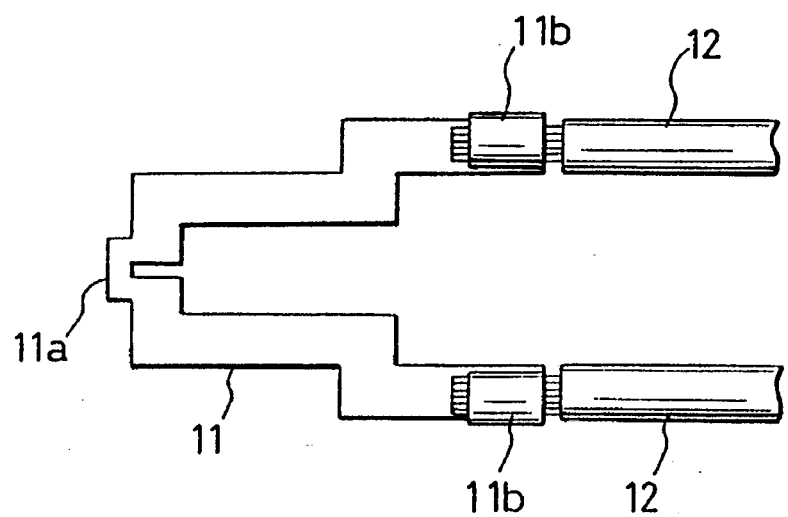
FIG. 2 is a top view of a terminal part in the probe in FIG. 1.

FIG. 1 is a perspective view showing the structure of a pad wear indicator probe (hereinafter probe) according to a first embodiment of the invention. FIG. 2 is a top view of an electric wire path in the probe.

In FIG. 1 and 2, a terminal 11 is formed to define an electric wire path and is turned substantially into a U shape. The terminal 11 includes a broken line part 11a projecting toward a tip at the part of the wire including a bend or turn. A pair of barrel parts, each designated as 11b, are crimped onto respective ones of a pair of electric wires 12 at rear ends thereof. The two terminals 11 are overlaid so as not to contact with each other and are offset and positioned so that they differ slightly in tip position of broken line part 11a. The probe 10 is molded in resin.

If the tip of the probe 10 is located on the side where the broken line 11a at the terminal 11 is disposed, the electric wire path defined by the terminal 11 whose broken line part 11a is closer to the tip is assumed to be a first detection part S1, and the electric wire path defined by the terminal 11 whose broken line part 11a is furthest from the tip is assumed to be a second detection part S2. In this embodiment, the two terminals 11 have a similar shape and are offset from each other. The invention, however, is not necessarily limited thereto, and terminals 11 having different lengths can also be provided and used in such a manner that the positions of broken line parts 11a are not aligned.

Figure 3:
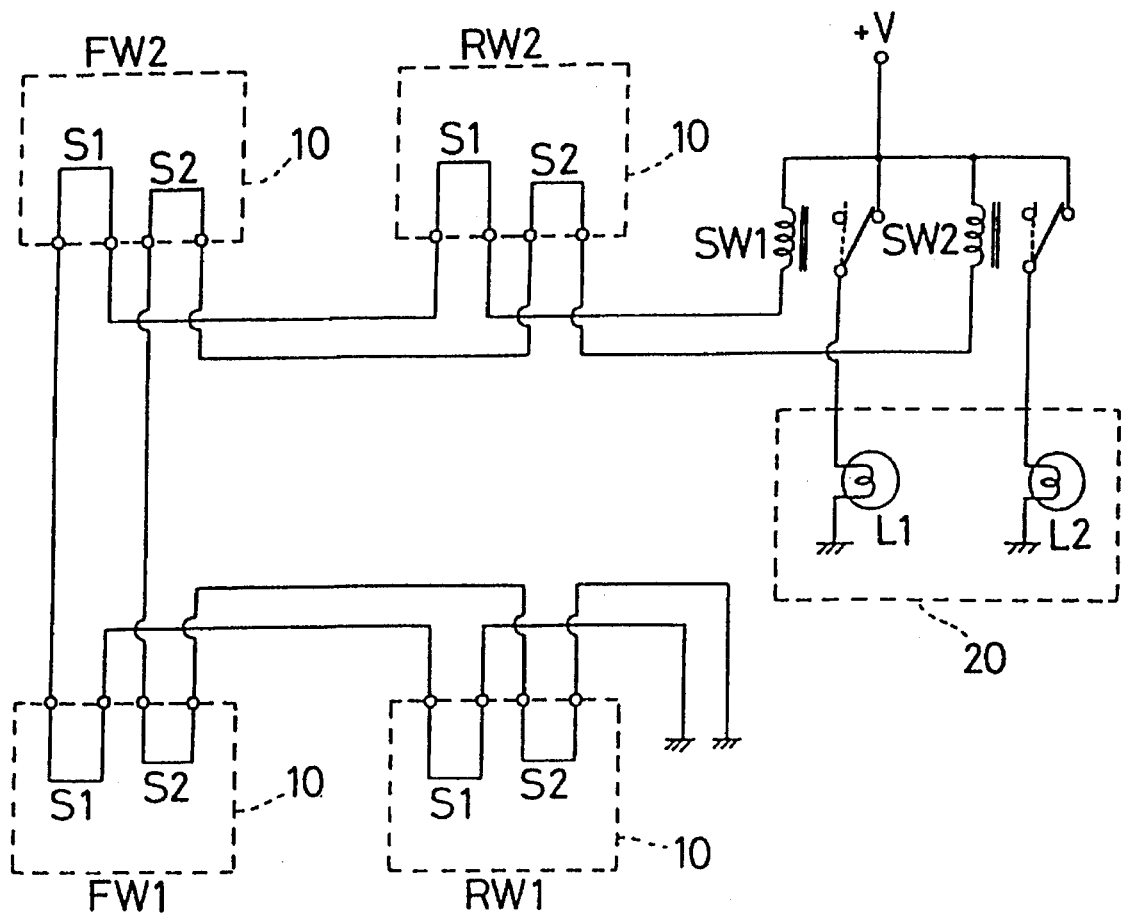
FIG. 3 is a schematic block diagram of a pad wear indicator.

The probe 10 is held to a brake pad with the tip of the probe 10 directed toward a brake disk for each wheel. As shown in FIG. 3, the electric wires 12 in the first detection parts S1 of the probes 10 are also connected in series, and the electric wires 12 in the second detection parts S2 of the probes 10 are connected in a separate series. Each series circuit has one end grounded and the other end connected to one end of an electro-magnetic coil in relay SW1 or SW2. The electro-magnetic coil has the other end connected to a positive power supply. Electro-magnetic switches in the relays SW1 and SW2 are connected in series with indicator lamps L1 and L2 respectively, one end being grounded and the other end being connected to a positive power supply. Neither electro-magnetic switch conducts when its corresponding electro-magnetic coil is energized.

Figure 4:
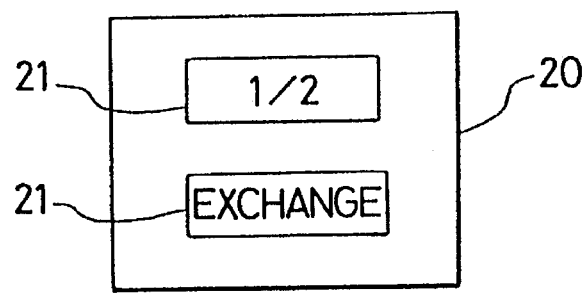
FIG. 4 is a front view of the indicator.

The indicator lamps L1 and L2 are housed in an indicator 20 disposed in a car. As shown in FIG. 4, the indicator 20 comprises two light transmission lenses or similar illuminating devices 21 with characters "1/2" and "EXCHANGE" (or other descriptive words to indicate a driver of the stage of brake wear) on their surfaces. The indicator lamps L1 and L2 are disposed on the rear surfaces thereof. In this embodiment, the relays SW1 and SW2 and the indicator 20 make up a pad wear indicator display.

The operation of this embodiment will now be described. When the probes 10 are first installed, they have not worn at all, and all terminals 11 form U-shaped electric wire paths. Therefore, both electric wire paths of the first series of detection parts S1 and the second series of detection parts S2 conduct, and the electro-magnetic coils of the relays SW1 and SW2 in series with the electric wire paths are energized from the positive power supply. Since the electro-magnetic coils are energized and excited, the electro-magnetic switches of the relays SW1 and SW2 become nonconducting, and the indicators L1 and L2 are not energized and remain off. This condition corresponds to the broken line position of the switch in FIG. 3. Therefore, the indicator 20 displays nothing, and the driver can recognize that little or no wear has occurred on the brake pads.

As the driver uses the brake, the brake pad wears, and thus, the probe 10 also approaches the brake disk and gradually wears from its tip portion. In the beginning of wearing the probe 10, only the mold part of resin wears, but as the brake pad wear develops, the resin of the probe 10 is gradually shaved off completely. The broken line part 11a of the first detection part S1 having the broken line part 11a near to the tip of the probe 10 starts to expose gradually, and the brake eventually contacts and completely shaves broken line part 11a.

If the broken line part 11a of the first detection part S1 is shaven away at any one of the four wheels, the series wire path grounded via the electro-magnetic coil of the relay SW1 from the positive power supply becomes nonconducting, and the electro-magnetic coil becomes deenergized, thereby causing the electro-magnetic switch of the relay SW1 to conduct for energizing and turning on the indicator lamp L1 (the solid line position of switch SW1 in FIG. 3). As a result, the lamp of the indicator 20 emits light on the rear of the light transmission lens 21 on which "1/2" is displayed. From the indicator lamp, the driver can recognize that the brake pad has worn although it need not be replaced immediately. In this case, the driver, who need not replace the brake pad immediately, does not feel the need to panic or a sense of unease. The driver may request servicing at a convenient and predetermined replacement time.

If the driver cannot replace the brake pad and continues to use it, the broken line part 11a of the second detection part S2 also starts to expose, contacts the brake disk and is eventually shaven. If the broken line part 11a of the second detection part S2 is shaven away at any one of the four wheels, as with the first detection part S1, the series wire path grounded via the electro-magnetic coil of the relay SW2 from the positive power supply no longer conducts, and the electro-magnetic coil is no longer energized, thereby causing the electro-magnetic switch of the relay SW2 to conduct for energizing and turning on the indicator lamp L2 (the solid line position of SW2 in FIG. 3). The indicator lamp L1 remains on because the power supply route to the electro-magnetic coil of the relay SW1 remains broken.

When the indicator lamp L2 goes on, the lamp on the rear of the light transmission lens 21 on which "EXCHANGE" is written also emits light at the indicator 20. From the illuminated "EXCHANGE" signal, the driver can recognize that wear has developed to an advanced degree, and the time to replace the brake pad is reached as expected. Therefore, the driver may replace the brake pads at the service factory as prompted by this indication. In this embodiment, when the second detection part S2 is broken, both indicator lamps L1 and L2 go on at the indicator 20. Other indication schemes are possible. For example, when the electro-magnetic coil of the relay SW2 is no longer energized, and if the power supply route to the indicator lamp L1 is turned off by using another contact of the relay SW2, only one of the indicator lamps L1 or L2 will be made to go on.

Because the conventional pad wear indicator display prompts the driver to replace the brake pad without much warning, some drivers may not recognize the importance of this indicator and will pay no attention to what maybe considered an emergency. Therefore, the driver must be requested to replace the brake pad before it wears completely, which results in premature servicing and waste. According to the invention, however, when one of the indicator lamps goes on, the driver is informed that the brake pad is close to requiring replacement, and when the second indicator lamp goes on, the driver can recognize the need for immediate replacement. Therefore, the EXCHANGE lamp need not be turned on until the brake pad wears considerably for effective use of resources.

Figure 5:
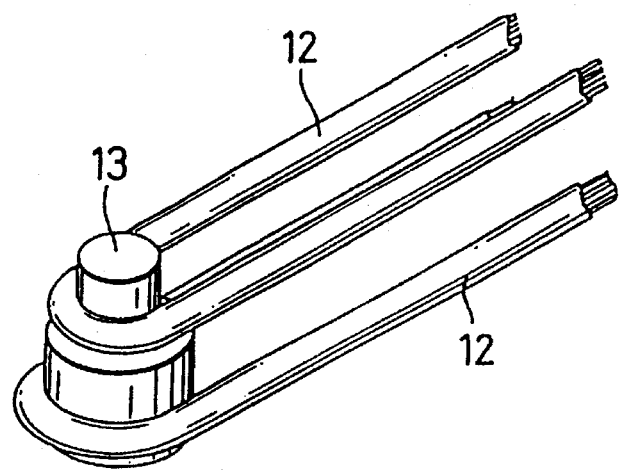
FIG. 5 is a perspective view showing a pad wear indicator probe according to a second embodiment of the invention.
Figure 6:
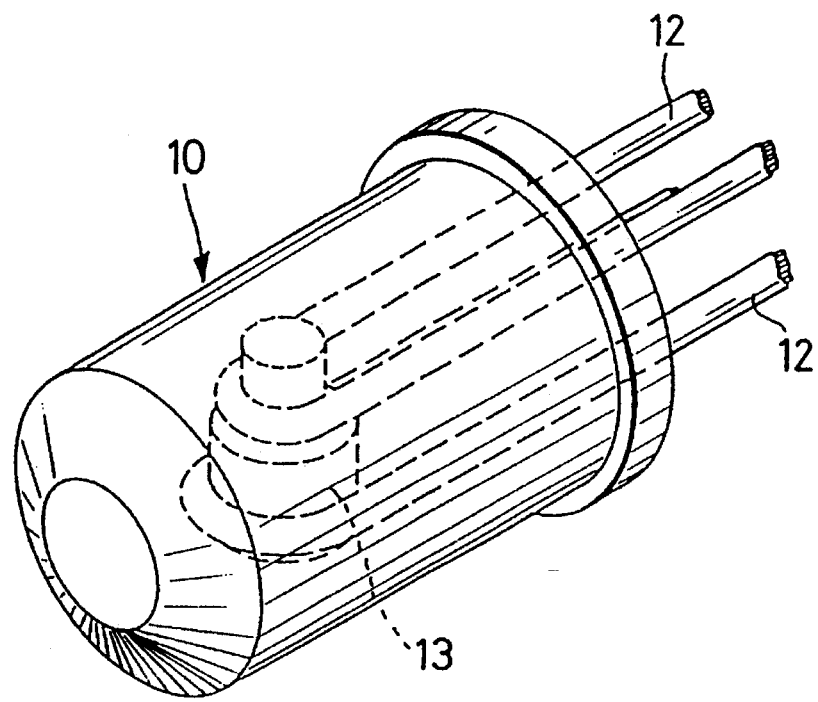
FIG. 6 is a perspective view of the assembled pad wear indicator probe according to the second embodiment of the invention.

FIGS. 5 and 6 show a probe according to another embodiment of the invention. In this embodiment, a cylindrical core 13 having the upper part 13a of small diameter and the lower part 13b of large diameter is provided. Separate electric wires 12 are wound around the small-diameter part and the large-diameter part, respectively, and turned and molded in one piece with resin (FIG. 6).

With this structure, since each electric wire 12 is wound around the different diameters about upper and lower portions of wire 13, the distance between the turn of one electric wire 12 and the tip of the probe 10 differs from that between the turn of the other electric wire 12 and the tip of the probe 10 by the difference in radius between the small-diameter and large-diameter parts. Therefore, in response to the wear development degree, the electric wire wound around the large-diameter part is first cut, then the electric wire wound around the small-diameter part is cut.

Figure 7:
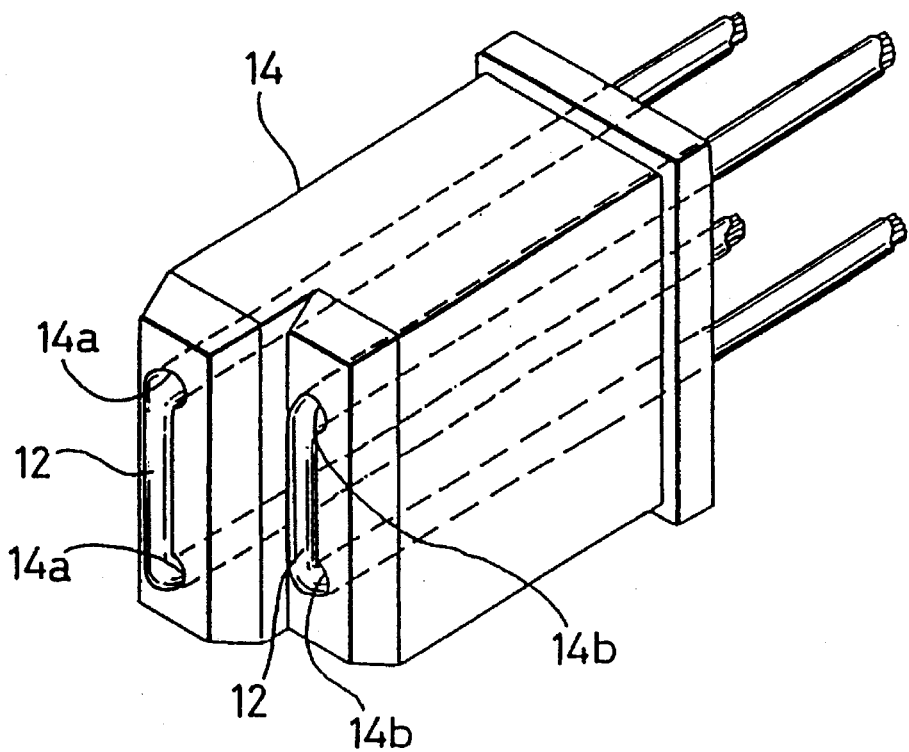
FIG. 7 is a perspective view of a pad wear indicator probe according to a third embodiment of the invention.

FIG. 7 shows a probe according to yet another embodiment of the invention. In this embodiment, stage parts are formed on the tip side of a resin-molded body 14, and a pair of through holes 14a, 14b are formed from the front end to rear end of each part. Two electric wires each designated by 12 that are turned or bent into a U-shape are inserted into the two pairs of through holes 14a and 14b.

With this structure, each electric wire 12 is turned on the respective tips of the stage parts formed on the tip of the resin-molded body 14, and the distance between the turn of one electric wire 12 and the tip of the probe 10 differs from that between the turn of the other electric wire 12 and the tip of the probe 10 by the stage-part difference. Therefore, in response to the wear development degree, the electric wire turned in the higher stage part is first cut, then the electric wire turned in the lower stage part is cut.

Figure 8:
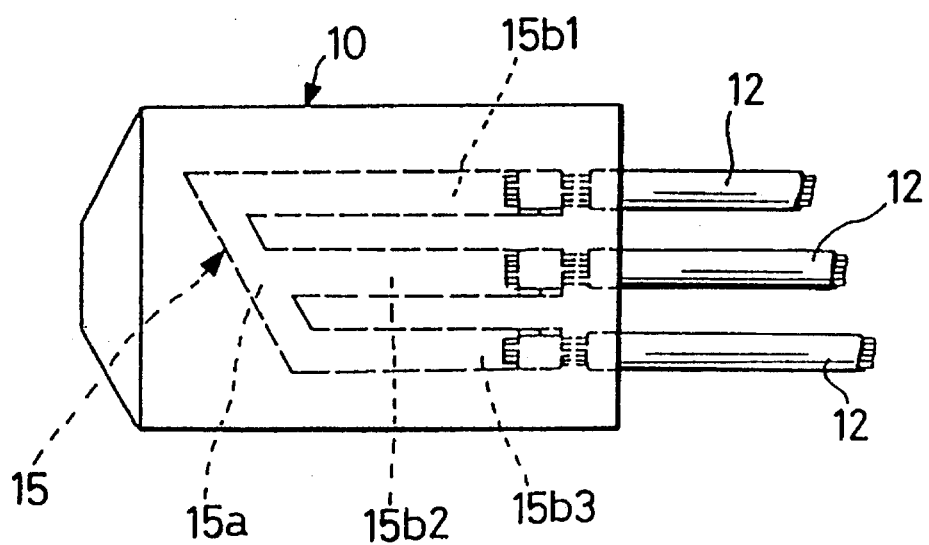
FIG. 8 is a perspective view of a pad wear indicator probe according to a fourth embodiment of the invention.
Figure 9:
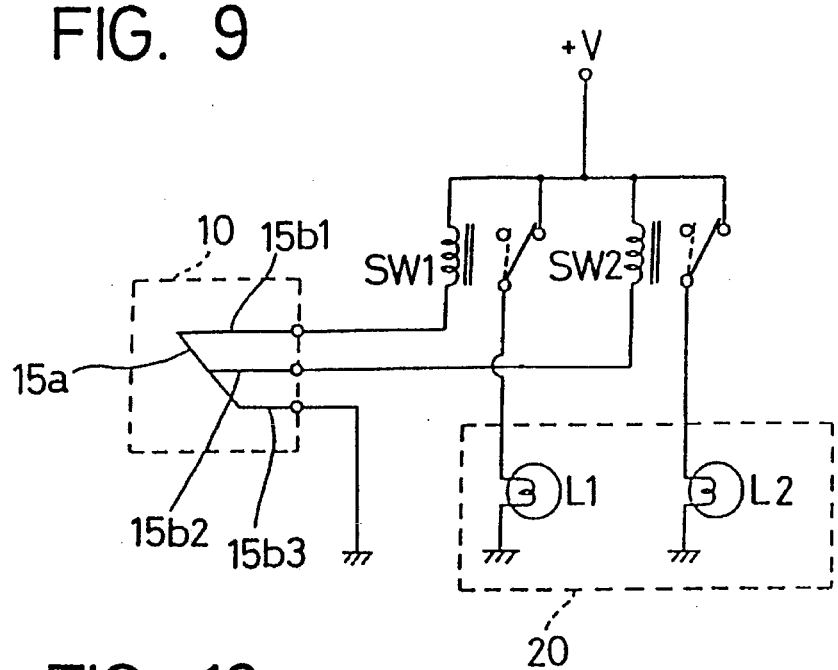
FIG. 9 is a schematic block diagram of a pad wear indicator using the pad wear indicator probe of FIG. 8.
Figure 10:
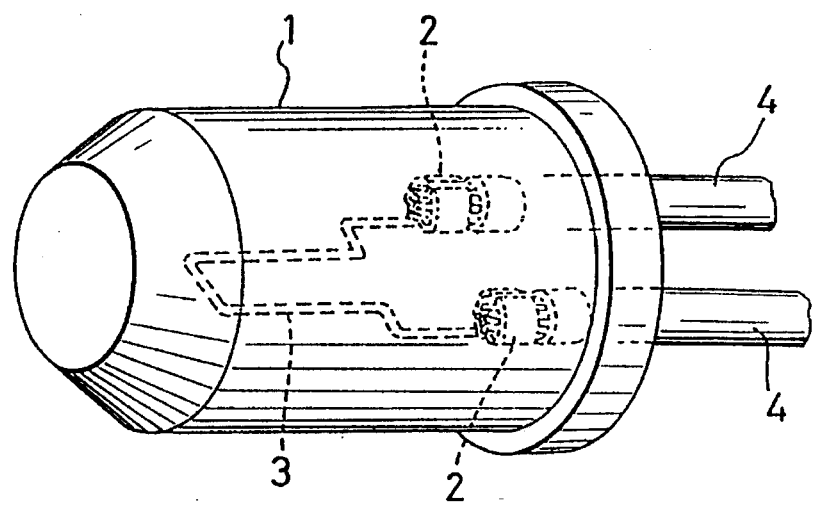
FIG. 10 is a perspective view of a conventional pad wear indicator probe.
Figure 11:
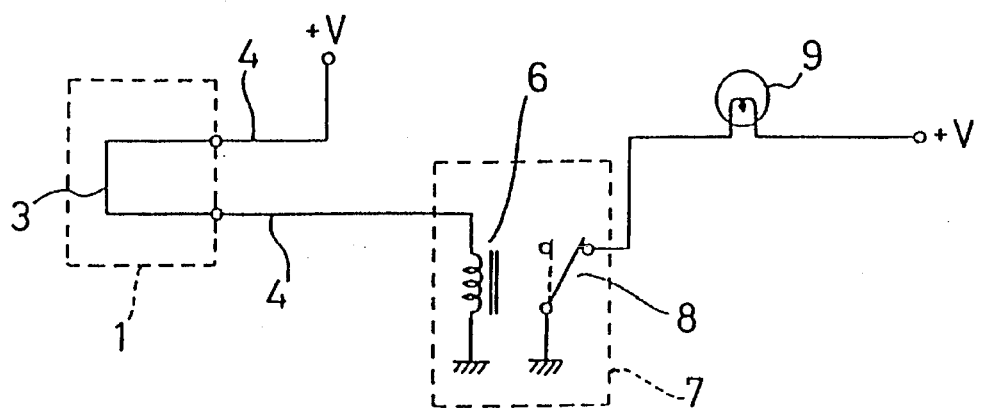
FIG. 11 is a schematic block diagram of a conventional pad wear indicator.

FIG. 8 shows a probe according to still another embodiment of the invention, and FIG. 9 shows the circuit configuration using the probe of FIG. 8 for displaying the wear condition.

In this embodiment, a terminal 15 comprises a line path 15a sloping toward the tip and detection line paths 15b1 to 15b3 extending from the front and rear ends and the middle of the slope line path 15a to the rear end of the probe 10. The detection line paths 15b1 to 15b3 are crimped onto electric wires 12 and are molded with resin to form the probe in a unitary assembly. The detection line path 15b3 is grounded, and the detection path line 15a is connected to one end of the electro-magnetic coil of relay SW1, and 15b2 is connected to one end of the electro-magnetic coil of relay SW2 (FIG. 9). The circuit configuration of the relays SW1 and SW2 and indicator lamps L1 and L2 is similar to that shown in FIG. 3.

With this structure, because the detection line paths 15b1 and 15b2 are initially connected to the detection line path 15b3 via the slope line path 15a, the electro-magnetic coils at the relays SW1 and SW2 are energized, and the indicator lamps L1 and L2 are not energized. However, as brake pad wear develops, the slope line path 15a is shaven from the tip side gradually, and conduction between the detection line path 15b1 and the slope line path 15a discontinues. As a result, the electro-magnetic coil of the relay SW1 is not energized and the indicator lamp L1 goes on for displaying "1/2" at an indicator 20. As the brake pad wear further develops, conduction between the detection line path 15b2 and the slope line path 15a is also turned off. The electro-magnetic coil of the relay SW2 is not energized, and the indicator lamp L2 goes on for displaying "EXCHANGE" at the indicator 20.

While the invention has been described in detail with reference to preferred embodiments thereof, which are intended to be illustrative but not limiting, various changes may be made without departing from the spirit and scope of the invention. For example, although wear development has been described in which two levels of wear are displayed, it is also possible to display wear in more steps using multiple indicator arrays connected to corresponding multiple line paths and displays.

What is claimed is:

1. A brake pad wear indicator probe comprising;
 a core element disposed near a tip of the probe, the core element having first and second diameter portions, said first diameter portion being larger than said second diameter portion; and
 a plurality of U-shaped electric wire paths having a turn part extending toward said tip of the probe, the turn part of each of said plurality of U-shaped electric wire paths wrapped around one of said first diameter portion and said second diameter portion, said plurality of electric wire paths being different in a length measured between the turn part of each of said plurality of electric wire paths and said tip of the probe;
 wherein said plurality of electric wire paths are engaged with a brake pad and wear together with the brake pad.

2. The brake pad wear indicator probe as claimed in claim 1, wherein a second distance from said second diameter portion to said tip of said probe is greater than a first distance from said first diameter portion to said tip of said probe.

3. The brake pad wear indicator probe as claimed in claim 1, further comprising a pad wear indicator display for signaling a broken line state of each of said plurality of U-shaped electric wire paths of said probe.

\* \* \* \* \*

UNITED STATES PATENT AND TRADEMARK OFFICE
CERTIFICATE OF CORRECTION

PATENT NO. : 5,608,376
DATED : March 4, 1997
INVENTOR(S) : Katsuya ITOH, Hitoshi TAKANASHI It is certified that error appears in the above-indentified patent and that said Letters Patent is hereby corrected as shown below:

On the title page,

In item [75] change "ITO" to --ITOH--.

Signed and Sealed this

Twenty-ninth Day of April, 1997

Attest:

BRUCE LEHMAN

Attesting Officer

Commissioner of Patents and Trademarks